Feb. 3, 1959   R. J. WHITE   2,872,135
AERODYNAMIC CONTROL SURFACE MOVEMENT ASSISTING MECHANISM
Filed Dec. 7, 1953   2 Sheets-Sheet 2
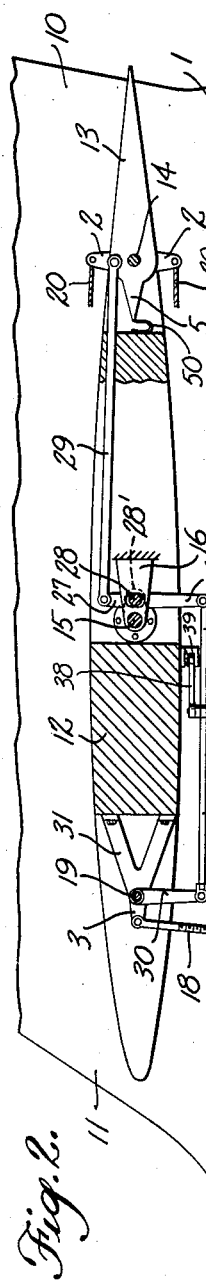
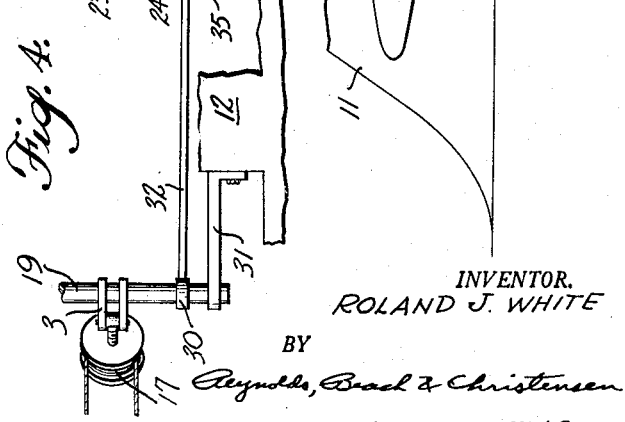
INVENTOR.
ROLAND J. WHITE
BY
*Reynolds, Beach & Christensen*
ATTORNEYS United States Patent Office 2,872,135
Patented Feb. 3, 1959

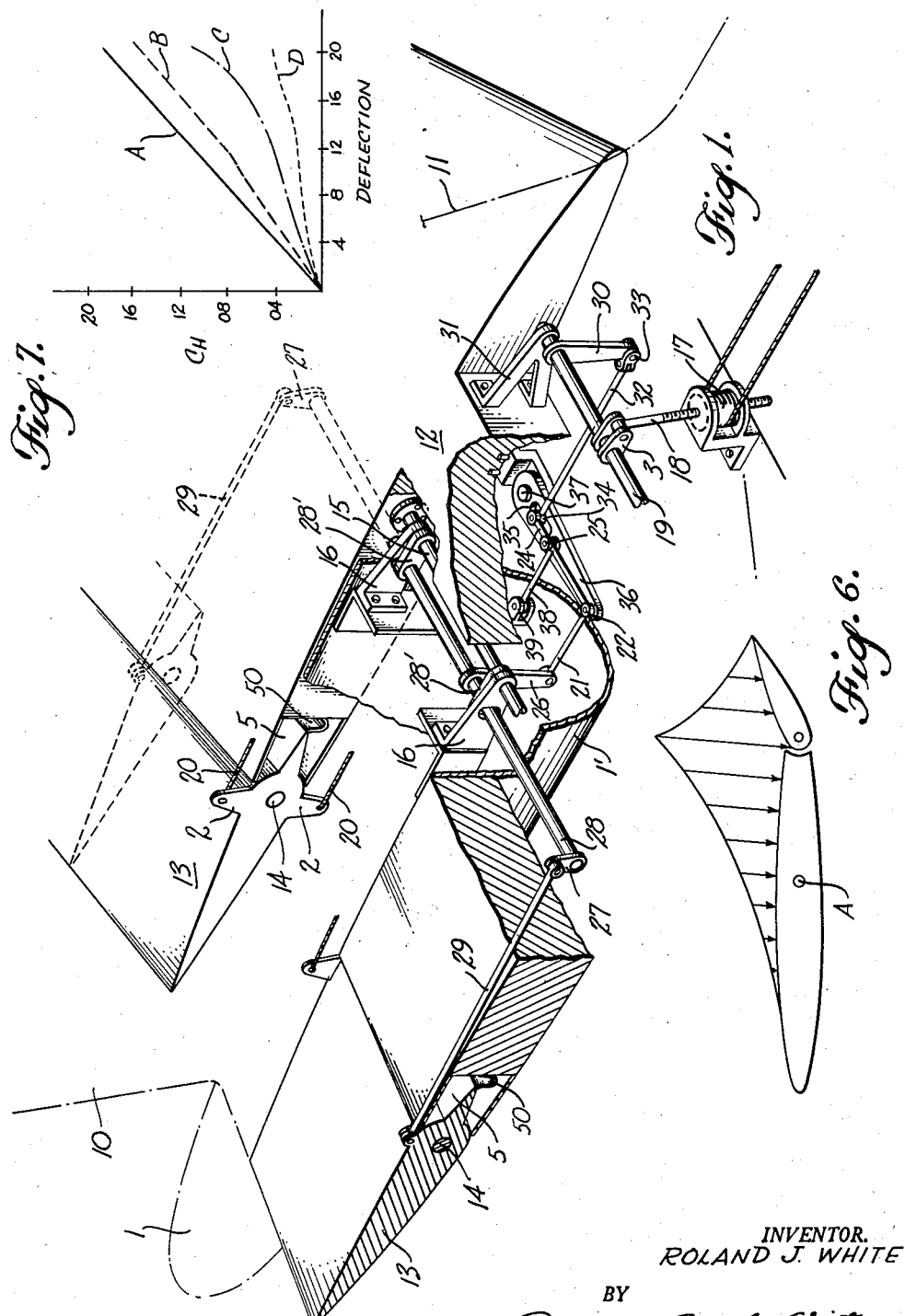

2,872,135

AERODYNAMIC CONTROL SURFACE MOVEMENT ASSISTING MECHANISM

Roland J. White, Seattle, Wash., assignor to Boeing Airplane Company, Seattle, Wash., a corporation of Delaware Application December 7, 1953, Serial No. 396,574

16 Claims. (Cl. 244—82)

The present invention pertains to movable aircraft control surfaces, is especially concerned with empennage control surfaces of airplanes, and more particularly airplane elevators. Its purpose is to assist the pilot in effecting movement of such a control surface.

While this invention could be utilized in the control system of lighter-than-air aircraft, it will find its greatest usefulness for heavier-than-air aircraft, and in particular airplanes, and consequently the following description will be directed toward this application of the invention, although it will be understood how the mechanism with which the invention is concerned could be utilized in other types of heavier-than-air aircraft than the airplane and for lighter-than-air aircraft.

The trend in transport and bomber airplanes for many years has been toward larger and still larger airplanes, while at the same time the trend has been toward higher speed airplanes. The type of aerodynamic reaction control surfaces used to maneuver airplanes has not changed appreciably in its basic concept since almost the earliest airplanes, however, although there has, of course, been much refinement in design and actuating mechanism. In general, however, the larger the airplane, the larger must be the control surfaces necessary to maneuver it, and the faster such airplanes fly, the greater is the air resistance per unit area of the control surface to its deflection from neutral position.

Because of these factors it has not been possible for a considerable time simply to provide a control surface pivoted substantially at its leading edge to be swung by the manual force alone which can be exerted by the pilot. The early trend was to assist the pilot in moving the control surface by shifting the pivot rearward from a location adjacent to the forward edge of the surface to provide an aerodynamic balance section, and this expedient was of great assistance. As the high speed of airplanes became greater, however, leading edge balances of the overhanging type or which were supported between the leading edge of the control surface and the fin or stabilizer ahead of the control surface were found to be unsatisfactory aerodynamically. Thickening of the stabilizer ahead of the conrol surface reduced this problem, but in present high speed airplanes it has been found to be desirable to use thin airfoils for stabilizer and control surface, so that the problem has returned.

Because of the problems mentioned in providing aerodynamic mechanism for assisting the movement of control surfaces, artificial power mechanisms have been used frequently to move or to aid the movement of control surfaces in large airplanes. Such power devices frequently have been hydraulic piston and cylinder mechanisms or electric motor mechanisms with which have been associated follow-up devices. Many such systems have proven to be quite complex and heavy, however, whereas it is always advantageous to use mechanism which is as simple and reliable as possible, and the airplane designer is constantly endeavoring to keep the weight of an airplane at a minimum consistent with safety and the design requirements of the airplane.

A principal object of the present invention, therefore, is to provide an aerodynamic type of control surface movement assisting mechanism which is entirely suitable for use in large high-speed airplanes of present design. Such mechanism does not have the disadvantages which have rendered previous types of aerodynamic control surface movement assisting mechanism impractical for such airplanes.

A further object is to provide such assisting mechanism which will be compact, of simple construction, light in weight, and which will require a minimum of servicing.

Another object is to provide such control surface movement assisting mechanism which can be designed readily for various airplanes, or which could be modified easily to satisfy the requirements for an airplane of a particular design.

Especially in its application to a horizontal stabilizer and elevator installation it is an object to integrate such control surface assisting mechanism with stabilizer angle adjusting mechanism in a simple fashion, and to enable the assisting mechanism to operate in a similar manner and with substantially equal effectiveness in whatever angle of incidence position the stabilizer may be adjusted.

The mechanism of the invention generally involves a lever type linkage interconnecting the control surface and the stabilizer ahead of it for conjoint pivotal movement. When deflection of the control surface relative to the stabilizer is initiated, aerodynamic loading is produced on the stabilizer which tends to rotate it about a pivot mounting, and such rotation moves linkage interconnecting the stabilizer and the control surface to exert a force on the control surface assisting it to continue its movement in the direction in which such movement was initiated. Moreover, the mechanism incorporates automatic linkage adjusting mechanism which will increase the assisting force produced by the stabilizer driven linkage on the control surface as the control surface moves farther from its neutral position.

Additional features and advantages of the present invention are discussed in the following detailed description of the installation of such mechanism illustrated in the accompanying drawings.

Figure 1 is a top perspective view of an installation of the control mechanism with parts broken away to disclose the structure of such mechanism more fully.

Figure 2 is a longitudinal sectional view through a portion of an airplane stabilizer and control surface assembly showing the installation of such control mechanism when the control surface is in its centered or neutral position, and Figure 3 is a similar view showing the disposition of the mechanism when the control surface is deflected from its central position.

Figure 4 is a plan view of the assisting mechanism with the parts illustrated in their positions occupied when the control surface is centered, and Figure 5 is a similar view showing the positions occupied by the parts of the mechanism when the control surface is deflected through a substantial angle from its central position.

Figure 6 is a diagrammatic representation of a stabilizer and control surface combination portraying the aerodynamic loading of these parts when the control surface is deflected through a substantial angle from its central position.

Figure 7 is a graph illustrating the reduction in control forces which can be obtained by the use of the present invention.

The mechanism of the present invention is most useful in its application to the horizontal stabilizer and elevator combination of an airplane empennage, and consequently such an installation is illustrated in the drawings. It is to be understood, however, that the principles of the invention are applicable also for assisting movement of other aircraft control surfaces associated with a movable stabilizing surface ahead of such control surface. The movement of such a stabilizing surface which occurs conjointly with movement of the control surface will, however, be much smaller than such control surface movement.

The stabilizer and elevators are shown somewhat diagrammatically in the drawings, because aside from the lever and linkage mechanism of the present invention the stabilizer and elevator assembly is conventional. The tail portion 1 of the airplane fuselage, the rudder 10 and vertical fin 11 are shown in phantom in Figure 1 and rather diagrammatically in solid lines in Figures 2 and 3. The horizontal stabilizer 12 is mounted pivotally on the vertical fin 11 just above the fuselage, and the elevators 13 are mounted hingedly on the trailing edge of the horizontal stabilizer by a suitably supported pivot rod 14.

The stabilizer is of the adjustable angle of incidence type and is supported by a pivot rod 15 secured to the stabilizer and journaled in brackets 16 fixedly mounted on the airplane fuselage, as shown in Figures 1 and 2. Preferably this stabilizer mounting rod is located approximately at the center of lift of the stabilizer. The stabilizer may be tilted to the desired angle of incidence by rotation of a drum 17 threadedly engaged with a lengthwise movable rod 18 connected to exert a tilting force on a rod 19 fixed to the forward portion of the stabilizer by suitable brackets as indicated in Figures 1 and 2. All of such stabilizer and elevator structures and mounting arrangements thus far specifically described are conventional.

For the purpose of the present invention it is essential that the stabilizer 12 or a portion of it adjacent to the control surface 13 be tiltable independently of the stabilizer angle adjusting mechanism 17, 18. Lever and linkage mechanism is provided to transmit to the control surface a force assisting its swinging when the movable stabilizer element is tilted relative to the normally stationary anchoring mechanism 17, 18 by aerodynamic forces acting on the stabilizer element as a result of initiation of swinging of the control surface relative to the stabilizer element.

The control surface 13 has projecting laterally from it two horns 2 to which are connected pilot operated control cables 20 in conventional fashion. These control cables are connected to the pilot's control in any suitable usual manner. While horns and control cables are shown, it will be understood that these are merely representative of some conventional type of pilot operated control for the control surface, and any desired type of pilot operated control surface swinging means can be used.

Movement of the control surface 13 from its centered or neutral position is initiated by the pilot operated control means 20. Comparatively little force is required to move the control surface slightly from its centered position, because the resistance to swinging movement of a control surface pivoted near its leading edge increases drastically with the degree of control surface displacement. When the elevator 13 is swung somewhat, for example, in an upwardly direction, a downward aerodynamic force is produced on it by the air passing over it, but in addition an aerodynamic force is also produced on the portion of the stabilizer adjacent to the control surface as shown by the force diagram of Figure 6. The pressure thus produced on the stabilizer element tends to rotate it about its pivot 15 in the direction opposite the direction in which the control surface is rotated about its pivot. In Figures 3 and 6 the elevator 13 is shown as having been swung in a counterclockwise direction about its pivot rod 14, and the resulting air load on the stabilizer element produces a moment tending to rotate it about its pivot axis 15 in a clockwise direction.

The mechanism of the present invention utilizes the torque of the stabilizer element about its pivot axis to produce a turning moment on the control surface assisting its continued movement in the direction in which it is displaced initially, so as to reduce the effort which must be exerted by the pilot on the direct controls 20 to effect further swinging of the control surface. Such mechanism is powered by actuating means driven by movement of the stabilizer 12 including a bell crank having one arm 3 pivoted to the normally stationary rod 18 of the stabilizer adjusting mechanism to serve as a reaction point. The other arm 30 of the bell crank extends generally parallel to the rod 18, being received within the cavity of the fuselage 1', and the junction between the arms 3 and 30 is pivotally mounted on the stabilizer by rod 19. While the arm 3 and the arm 30 of the bell crank mechanism could be formed as a single unit, interference with movement of the parts is more easily avoided by securing each of these arms separately to the rod 19 in spaced relationship, as shown in Figure 1. For all practical purposes, however, the arms 3 and 30 together constitute a bell crank. The rod 19 is journaled in the brackets 31 carried by the stabilizer so that the arms 3 and 30 will always swing conjointly.

To the swinging end of arm 30 is connected a link 32 by a universal joint 33. The opposite end of this link carries a boss 34 which is received in a slot 35 of a lever arm 36 swingable about a pivot 37 carried fixedly by the stabilizer 12, as shown best in Figure 1. At a location more remote from the pivot 37 than the boss 34, and preferably at the swinging end of the lever, a link 21 is secured to the lever 36 by a pivot 22. Also, interconnecting the pivot 22 and the end of link 32 at boss 34 is a toggle joint including links 23 and 24 interconnected by pivot 25. Relative movements of links 24 and 25 of this toggle joint are controlled by an anchor link 38 having one end pivotally connected to the pivot 25 and its other end anchored by a pivot 39 fixedly carried by the stabilizer 12.

The end of link 21 remote from lever 36 is pivoted to arm 26 of lever mechanism having additional arms 27 extending oppositely to arm 26 from a fulcrum shaft 28 to which all of these lever arms are secured. The swinging ends of levers 27 are connected by push-pull links 29 to the respective control surfaces 13 at locations eccentrically of their pivots 14. The pivot rod 28 is held aginst fore and aft movement relative to the stabilizer pivot 15 by links 28', and slots are provided in arms 16 to receive the fulcrum rod 28 and enable it to swing to a limited degree about the stabilizer pivot 15 as an axis when the stabilizer swings.

As mentioned previously, when a control surface is displaced somewhat from its central position, aerodynamic loading to which it is then subjected is supplemented by aerodynamic loading on the stabilizer element principally at a location immediately ahead of the control surface, as indicated in Figure 6. Such loading on the stabilizer element produces a torque about the stabilizer pivot rod 15 which will tend to displace rod 19 located forward of the stabilizer pivot. Movement of such rod will swing arm 3 about its end connected to bolt 18, which is effectively anchored by such bolt. Swinging of this arm will effect swinging of arms 30 through an equal angle.

It will be appreciated that upward swinging, for example, of an elevator will reduce the effective angle of attack of the horizontal empennage surfaces, while the accompanying clockwise swinging of the stabilizer element 12 about its pivot 15, as shown in Figure 3, will cause an increase in the angle of incidence of the stabilizer. Thus the movements of the control surface and of the stabilizer will buck each other to some extent, and because the stabilizer element as shown is considerably larger in area than the elevator, it is important that the angular movement of the stabilizer be quite small. With lever and linkage mechanism of the type shown, for example, the angular movement of the elevator near zero angle of incidence will be approximately forty times as much as the angular movement of the stabilizer, or more. In fact, the total displacement of the elevator may be only twenty degrees and that of the stabilizer only one-half a degree, making an over-all average relative movement of forty-to-one. It is desirable, however, for the ratio of stabilizer displacement for a given elevator displacement to be much greater at large angles of elevator movement than for small angles.

Movement amplification between the stabilizer element and the control surface is effected by proportioning the various lever arms properly. Thus the lever arm 3 extending between the stabilizer rod 19 and the fuselage carried anchor point represented by rod 18 is comparatively short, whereas the lever arm 30, always moved through the same angle as lever arm 3, is much greater. Also the lever arm between pivot 37 and pivot 22 is much greater than that between pivot 37 and boss 34, so that lever 36 will effect considerable amplification of movement. Furthermore, arm 26 is considerably shorter than lever arm 36, and also since the lever arm between link 29 and the pivot axis of the control surface is shorter than arm 27, the angular movement of the elevator assisted by force applied by this linkage is far greater than the angular movement of arm 3.

The smaller the displacement of stabilizer element 12 for a given displacement of control surface 13, the smaller will be the mechanical advantage, and, in turn, the smaller will be the control surface movement assisting force supplied by the mechanism described. As the control surface departs farther from its neutral position, therefore, it is desirable for the ratio of stabilizer element movement to control surface movement to increase progressively. This result may be accomplished by providing variable mechanical advantage lever mechanism between the stabilizer element and the control surface connections of the mechanism. The particular movement ratio altering arrangement illustrated in the drawing is the toggle joint 23, 24 and the anchor link 38 connected to its pivot 25. A constant movement ratio would be obtained by pivoting link 32 directly to lever 36 at a fixed location instead of placing the boss 34 in the slot 35 of lever 36 to enable the distance between such boss and the lever pivot 37 to be varied.

The movement ratio varying action of the toggle joint 23, 24 is illustrated by comparison of Figures 4 and 5. When the control surface 13 is in its neutral or central position of Figure 2, the ratio of stabilizer element to control surface element movement is the smallest because links 23 and 24 are in alignment placing the boss 34 of link 32 in its position of closest approach to the pivot 37 of lever 36. Since the ratio of the distances from the lever pivot 37 to boss 34 and pivot 22 determines the change in angular displacement of control surface and stabilizer for different degrees of control surface swing, the design of the toggle joint 23, 24 will establish the variation in movement relationship of the elevator and stabilizer unit.

As indicated in Figure 5, the function of link 38 is to hold the toggle joint pivot 25 in a substantially central location so that as lever 36 is swung in one direction from its position corresponding to neutral position of the control surface, the toggle joint will break in one direction, and when the lever 36 is swung in the opposite direction, the toggle joint will break in the opposite direction. In whichever direction the lever 36 swings from its position shown in Figure 4, breaking of the toggle joint from a position in which its links 23 and 24 are aligned will cause shortening of the toggle joint. Because one end of link 23 is anchored at a fixed location to arm 36 by pivot 22, all the shortening of the toggle joint 23 and 24 will effect displacement of boss 34 farther from pivot 37 of lever arm 36.

For a given angle of swing of such lever, the retraction of boss 34 from pivot 37 thus effected may be determined by the design of the toggle joint 23, 24. The length of anchor link 38 is immaterial, except that it should be long enough so that it will not be swung appreciably by swinging of lever 36 and the toggle joint links. Assuming that the aggregate length of links 23 and 24 remains constant, the shorter link 24 is the less will be the movement of boss 34 along slot 35 for a given angular displacement of lever 36. Conversely, the shorter link 23 is, the greater will be the movement of boss 34. It will be understood, of course, that link 23 must not be made so short as to limit the swing of lever arm 36.

It will now be evident that as the control surface 13 is swung slightly from its central position, such as upward toward the position shown in Figure 3, the aerodynamic force acting on the stabilizer element 12 will turn it in a clockwise direction about its pivot 15. Such rotation will raise rod 19, which will result in the swinging of such rod, arm 3, and arm 30 in the counterclockwise direction. Such movement will cause the swinging end of arm 30 to exert a thrust on link 32 in the direction indicated by the arrows in Figures 3 and 5. The force thus transmitted from the boss 34 of the link to the slot 35 of lever 36 will swing such lever clockwise as seen in Figure 5. This lever movement will shift link 21 to turn lever 26, shaft 28 and levers 27 counterclockwise, as indicated in Figure 3. Such movement of levers 27 will pull rods 29 to exert an upward swinging moment on the control surface.

As the control surface 13 is swung through a progressively greater angle, of course, the aerodynamic forces illustrated in Figure 6 will increase, producing a greater turning moment on the stabilizer element. The force transmitted to the control surface by rotation of the stabilizer element would be increased correspondingly, but such control surface swinging assisting force may be increased further by increasing the movement of the stabilizer element for a given additional displacement of the control surface. This result is accomplished by changing the lever arm ratios of lever 36 by shifting the boss 34 along slot 35 as previously explained.

The degree of control surface movement assistance which can be supplied typically by using the present mechanism is illustrated graphically in Figure 7. Assuming that twenty percent of the average composite stabilizer and control surface chord is the average chord of the control surface, the torque required to be exerted by the pilot for varying degrees of control surface displacement is represented by curve A. Curve B shows the torque which would be necessary for effecting control surface displacement if only an internal balance 5 and a seal strip 50 of conventional construction were utilized.

Curve C represents the torque which the pilot would be required to supply to swing a similar control surface in a comparable installation, including the internal balance and pressure seal, and, in addition, the assisting mechanism described above without the toggle joint 23, 24. In that case the boss 34 would be pivoted on lever 36 at a fixed location. Curve D represents the ideal situation where the torque which must be supplied by the pilot to swing the control surface is substantially linear for all angles of displacement, and the greatest torque required is easily within the capabilities of the pilot. Such torque values, as shown by this curve, are all that would be required by the pilot where a combination of internal balance and pressure seal with the variable mechanical advantage assisting mechanism including the toggle joint 23, 24 is used.

It is not necessary, of course, to employ an internal balance and pressure seal in conjunction with the control surface movement assisting mechanism described, but in that case the control forces which must be exerted by the pilot would be somewhat greater. An advantage of the present assisting mechanism is that its benefits can be combined with other types of aerodynamic assisting mechanism, such as an internal balance and pressure seal, instead of it being necessary to rely only on one or the other of such expedients.

Incorporation of the control surface movement assisting control will not in the least interfere with angular adjustment of the stabilizer element to trim the airplane. The threaded rod 18 connected to arm 3 may be shifted vertically any amount within its capabilities, and at any time by rotation of the stabilizer adjusting drum 17. Such movement of the stabilizer adjusting mechanism will not effect control surface swinging movement of the mechanism described, because the aerodynamic forces acting on opposite sides of the control surface tend strongly to maintain such control surface in its neutral or centered position, in the absence of displacement of the control surface being initiated by a force produced by the pilot.

The stabilizer adjusting mechanism does not hold the stabilizer rigidly in fixed position, of course, as is usual, because of the presence of the linkage and lever mechanism described, and consequently if the stabilizer pivot 15 is not located substantially at the center of lift of the stabilizer and control surface combination, there will be a tendency for upward or downward gusts to rotate this structure in one direction or the other about its pivot, depending upon the relationship of the pivot axis to the center of lift. Such rotation would, of course, tend to effect displacement of the control surface relative to the stabilizer element and might actually effect such a displacement if the distance between the center of lift and the stabilizer pivot 15 were great enough and the up-gust or down-gust were sufficiently severe.

Consequently, unless the center of lift of the stabilizer and control surface combination coincides with the pivot axis, it is preferable to have the pivot axis located somewhat forward of the center of lift. In that event an increased lift caused by an increase in angle of attack, for example, would tend to rotate the stabilizer in a counterclockwise direction about its pivot 15, as seen in Figures 2 and 3. Such movement would cause the arms 3 and 30 to be swung clockwise, effecting movement of the lever and linkage mechanism described to apply a force to the elevator tending to swing it downward as indicated in Figure 3. If the increased lift is of sufficient intensity to effect such swinging of the control surface, the lift of the stabilizer and elevator combination would be increased by such movement, thus resulting in an automatic further increase in lift tending to restore the lower angle of attack. The control surface movement assisting mechanism described could therefore be utilized to improve the stability of an airplane, but its primary purpose, as explained, is to assist the pilot by utilization of aerodynamic forces to effect maneuvering movement of a control surface.

I claim as my invention:

1. Aircraft control surface movement-assisting mechanism for a control surface connected to a movable stabilizer element and swingable relative thereto, such control surface having pilot-operated control means connected directly thereto which are operable to exert a force thereon tending to swing the control surface relative to the stabilizer element, which mechanism comprises actuating means connected to the stabilizer element and movable by movement of the stabilizer element, which stabilizer element movement is effected by aerodynamic force on the stabilizer element produced by swinging of the control surface relative to the stabilizer element away from neutral position, lever means, first linkage means interconnecting said actuating means and a portion of said lever means relatively close to but spaced from its fulcrum and operable by movement of said actuating means to exert a force on said lever means tending to swing said lever means, and second linkage means connecting the control surface and a portion of said lever means relatively far from its fulcrum and operable to exert on the control surface a force tending to swing the control surface relative to the stabilizer element farther from neutral position in response to the force exerted on said lever means by said actuating means and said first linkage means.

2. Aircraft control surface movement-assisting mechanism for a control surface pivotally mounted on the trailing edge of a stabilizer element swingable about an axis located a substantial distance forward of its trailing edge, such control surface having pilot-operated control means connected directly thereto which are operable to exert a force thereon tending to swing the control surface relative to the stabilizer element, which mechanism comprises actuating means connected to the stabilizer element and movable by swinging thereof in the rotative direction opposite that of the control surface, which stabilizer element swinging is effected by aerodynamic force on the stabilizer element produced by swinging of the control surface relative to the stabilizer element away from neutral position, lever means, first linkage means interconnecting said actuating means and a portion of said lever means relatively close to but spaced from its fulcrum and operable by movement of said actuating means to swing said lever means, and second linkage means connecting the control surface and a portion of said lever means relatively far from its fulcrum and urging the control surface to swing through an angle relative to the stabilizer element farther from neutral position of a magnitude much greater than the angle of swing of the stabilizer element effecting movement of said lever means by said actuating means and first linkage means.

3. Aircraft control surface movement-assisting mechanism for a control surface connected to a movable stabilizer element and swingable relative thereto, such control surface having pilot-operated control means connected directly thereto which are operable to exert a force thereon tending to swing the control surface relative to the stabilizer element, which mechanism comprises actuating means connected to the stabilizer element and movable by movement of the stabilizer element, which stabilizer element movement is effected by aerodynamic force on the stabilizer element produced by swinging of the control surface relative to the stabilizer element away from neutral position, lever means, first linkage means interconnecting said actuating means and a portion of said lever means relatively close to but spaced from its fulcrum and operable by movement of said actuating means to exert a force on said lever means tending to swing said lever means, second linkage means connecting the control surface and a portion of said lever means relatively far from its fulcrum and operable to exert on the control surface a force tending to swing the control surface relative to the stabilizer element farther from neutral position in response to the force exerted on said lever means by said actuating means and said first linkage means, and toggle joint means interconnecting said lever means and one of said linkage means and operable by swinging of said lever means to vary the spacing between the lever means fulcrum and the connection of the lever means with the linkage means to which said toggle joint is connected to alter the movement ratio between said first linkage means and said second linkage means.

4. The control surface movement-assisting mechanism defined in claim 3, and means movable to vary the spacing between the lever means fulcrum and the connection of at least one of the linkage means with the lever means to alter the movement ratio between the first linkage means and the second linkage means.

5. The control surface movement-assisting mechanism defined in claim 3, and means operable by swinging of the lever means to alter the spacing between the lever means fulcrum and the connection of at least one of the linkage means to the lever means progressively as the lever means swings to vary progressively the movement ratio between the first linkage means and the second linkage means, and consequently between the stabilizer element and the control surface, as the control surface swings farther from neutral position.

6. The control surface movement-assisting mechanism defined in claim 3, and means operable by swinging of the lever means to alter the spacing between the lever means fulcrum and the connection of at least one of the linkage means to the lever means progressively as the lever means swings to increase progressively the movement ratio between the first linkage means and the second linkage means, and consequently between the stabilizer element and the control surface, as the control surface swings farther from neutral position.

7. The control surface movement-assisting mechanism defined in claim 3, and means operable by swinging of the lever means to increase the spacing between the lever means fulcrum and the connection of the first linkage means to the lever means progressively as the lever means swings to increase progressively the movement ratio between the first linkage means and the second linkage means, and consequently between the stabilizer element and the control surface, as the control surface swings farther from neutral position.

8. The control surface movement-assisting mechanism defined in claim 3, in which the control surface is an airplane elevator.

9. Aircraft control surface movement-assisting mechanism for a control surface connected to a movable stabilizer element and swingable relative thereto, such control surface having pilot-operated control means connected thereto which are operable to exert a force thereon tending to swing the control surface relative to the stabilizer element, which mechanism comprises actuating means connected to the stabilizer element and movable by movement of the stabilizer element, which stabilizer element movement is effected by aerodynamic force on the stabilizer element produced by swinging of the control surface relative to the stabilizer element away from neutral position, lever means, first linkage means interconnecting said actuating means and a portion of said lever means relatively close to but spaced from its fulcrum and operable by movement of said actuating means to exert a force on said lever means tending to swing said lever means, second linkage means connecting the control surface and a portion of said lever means relatively far from its fulcrum and operable to exert on the control surface a force tending to swing the control surface relative to the stabilizer element farther from neutral position in response to the force exerted on said lever means by said actuating means and first linkage means, and toggle joint means interconnecting said first linkage means and said second linkage means and operable by swinging of said lever means to vary the spacing between the connections of the two linkage means with said lever means to alter the movement ratio between said first linkage means and said second linkage means.

10. Aircraft control surface movement-assisting mechanism for a control surface connected to a movable stabilizer element and swingable relative thereto, such control surface having pilot-operated control means connected thereto which are operable to exert a force thereon tending to swing the control surface relative to the stabilizer element, which mechanism comprises actuating means connected to the stabilizer element and movable by movement of the stabilizer element, which stabilizer element movement is effected by aerodynamic force on the stabilizer element produced by swinging of the control surface relative to the stabilizer element away from neutral position, lever means, first linkage means interconnecting said actuating means and a portion of said lever means relatively close to but spaced from its fulcrum and operable by movement of said actuating means to exert a force on said lever means tending to swing said lever means, second linkage means connecting the control surface and a portion of said lever means relatively far from its fulcrum and operable to exert on the control surface a force tending to swing the control surface relative to the stabilizer element farther from neutral position in response to the force exerted on said lever means by said actuating means and first linkage means, and toggle joint means interconnecting said lever means and said first linkage means and operable by swinging of said lever means to vary the spacing between the lever means fulcrum and the connection of said first linkage means with said lever means to alter the movement ratio between said first linkage means and said second linkage means.

11. Aircraft control surface movement-assisting mechanism for a control surface pivotally mounted on the trailing edge of a stabilizer swingable about an axis extending transversely of the aircraft substantially at the center of lift of the stabilizer and control surface combination, such control surface having pilot-operated control means connected thereto which are operable to exert a force thereon tending to swing the control surface relative to the stabilizer, which mechanism comprises actuating means connected to the stabilizer and movable by swinging thereof, which stabilizer swinging is effected by aerodynamic force on the stabilizer produced by swinging of the control surface relative to the stabilizer away from neutral position, lever means, first linkage means interconnecting said actuating means and a portion of said lever means relatively close to but spaced from its fulcrum and operable by movement of said actuating means to swing said lever means, and second linkage means connecting the control surface and a portion of said lever means relatively far from its fulcrum and urging the control surface to swing through an angle relative to the stabilizer farther from neutral position of a magnitude greater than the angle of swing of the stabilizer effecting movement of said lever means by said actuating means and first linkage means.

12. The control surface movement-assisting mechanism defined in claim 11, and means supporting the lever means from the stabilizer substantially at the location of the stabilizer's rotative axis.

13. The control surface movement-assisting mechanism defined in claim 11, and means interposed between the aircraft structure and the first linkage means and operable to exert a force on such first linkage means to effect angular adjustment of the stabilizer relative to the aircraft structure without effecting movement of the first linkage means relative to the stabilizer.

14. Aircraft control surface movement-assisting mechanism for a control surface pivotally mounted on the trailing edge of a stabilizer element swingable about an axis located a substantial distance forward of its trailing edge, such control surface having pilot-operated control means connected thereto which are operable to exert a force thereon tending to swing the control surface relative to the stabilizer element, which mechanism comprises actuating means connected to the stabilizer element and movable by swinging thereof in the rotative direction opposite that of the control surface, which stabilizer element swinging is effected by aerodynamic force on the stabilizer element produced by swinging of the control surface relative to the stabilizer element away from neutral position, lever means, first linkage means interconnecting said actuating means and said lever means and operable by movement of said actuating means to swing said lever means, and second linkage means connecting said lever means and the control surface and urging the control surface to swing relative to the stabilizer element farther from neutral position in response to movement of said lever means effected by said actuating means and said first linkage means.

15. Airplane control surface movement-assisting mechanism for a control surface pivotally mounted on the trailing edge of a stabilizer tiltable about an axis located approximately at the center of the stabilizer and control surface combination, such control surface having pilot-operated control means connected thereto which are operable to exert a force thereon tending to swing the control surface relative to the stabilizer, which mechanism comprises actuating means connected to the stabilizer and movable by tilting thereof in the rotative direction opposite that of the control surface, which stabilizer tilting is effected by aerodynamic force on the stabilizer produced by swinging of the control surface relative to the stabilizer away from neutral position, lever means fulcrumed on the stabilizer adjacent to the stabilizer's rotative axis, first linkage means interconnecting said actuating means and said lever means, means interengaged between the airplane and said actuating means and operable to exert a force on said actuating means to effect angular adjustment of the stabilizer relative to the airplane structure without effecting movement of said first linkage means relative to the stabilizer, but movement of said actuating means relative to said interengaged means being operable to effect movement of said first linkage means relative to the stabilizer to exert a force on said lever means tending to swing it, and second linkage means connecting said lever means and the control surface and operable to exert on the control surface a force tending to swing the control surface relative to the stabilizer in response to the force exerted on said lever means by said actuating means and first linkage means.

16. The control surface movement-assisting mechanism defined in claim 15, in which the first linkage means is connected to the lever means at a location closer to its fulcrum than the connection of the second linkage means to the lever means, to effect movement of the control surface relative to the stabilizer through an angle much greater than the angle of movement of the stabilizer relative to the airplane structure.

References Cited in the file of this patent

UNITED STATES PATENTS

| | | |
|---|---|---|
| 2,351,307 | Vorech | June 13, 1944 |
| 2,357,465 | Focht | Sept. 5, 1944 |
| 2,557,426 | George | June 19, 1951 |
| 2,577,439 | Wendt | Dec. 4, 1951 |
| 2,613,891 | Knight | Oct. 14, 1952 |

OTHER REFERENCES

National Advisory Committee for Aeronautics, Technical Note No. 1139, Figure 10, October 1946, 244–82.5.

UNITED STATES PATENT OFFICE

CERTIFICATE OF CORRECTION

Patent No. 2,872,135         February 3, 1959

Roland J. White

It is hereby certified that error appears in the printed specification of the above numbered patent requiring correction and that the said Letters Patent should read as corrected below.

Column 1, lines 53 and 54, strike out "which were supported between the leading edge of the control surface and" and insert instead -- control surface leading edge balances which could swing into a position projecting laterally outward beyond the surface of --.

Signed and sealed this 20th day of October 1959.

(SEAL)
Attest:

KARL H. AXLINE
Attesting Officer

ROBERT C. WATSON
Commissioner of Patents